United States Patent [19]
Haid

[11] 3,831,014
[45] Aug. 20, 1974

[54] ANALOG COMPUTER CIRCUIT FOR PERFORMING MULTIPLICATION, DIVISION AND SQUARE ROOT

[75] Inventor: William R. Haid, Georgetown, Mass.

[73] Assignee: Bailey Meter Company, Wickliffe, Ohio

[22] Filed: Feb. 2, 1973

[21] Appl. No.: 328,911

[52] U.S. Cl............... 235/195, 235/193.5, 235/194
[51] Int. Cl............................ G06j 7/16, G06j 7/20
[58] Field of Search .......... 235/195, 194, 196, 193, 235/193.5; 328/160, 161; 307/229, 230

[56] References Cited
UNITED STATES PATENTS

| | | | |
|---|---|---|---|
| 3,043,516 | 7/1962 | Abbott et al.................... | 235/193 X |
| 3,383,501 | 5/1968 | Patchell............................. | 235/195 |
| 3,466,460 | 9/1969 | Connolly.......................... | 235/194 X |
| 3,493,737 | 2/1970 | Edelson........................... | 235/195 X |
| 3,636,332 | 1/1972 | Nelson............................... | 235/195 |

Primary Examiner—Joseph F. Ruggiero
Attorney, Agent, or Firm—Joseph M. Maguire; George L. Kensinger

[57] ABSTRACT

A first positive voltage and a first negative voltage, each having an amplitude that is proportional to a first variable, $Y$, are alternately integrated by an integrating amplifier to generate a triangular wave signal. The maximum and minimum amplitude of the triangular wave are constrained to equal the magnitude of a voltage proportional to a second variable $Z$. Under these conditions, the frequency of the triangular wave signal is proportional to $Y/Z$. Once during each cycle of the triangular wave signal, a second integrating circuit is driven with a pulse having a fixed time duration and an amplitude proportional to a third variable $X$. The output of the second integrating circuit is a voltage proportional to $XY/Z$.

12 Claims, 8 Drawing Figures

ANALOG COMPUTER CIRCUIT FOR PERFORMING MULTIPLICATION, DIVISION AND SQUARE ROOT

BACKGROUND OF THE INVENTION

The present invention relates to an analog computer circuit and in particular to an analog computer circuit for performing multiplication, division and square root.

The present invention discloses a circuit that has an output voltage that is a function of three input voltages $X$, $Y$ and $Z$. By connecting the appropriate signals to the inputs of the analog circuit, the output can be made to vary in proportion to $XY/Z$, $X^2/Z$ or $\sqrt{XY}$.

One prior art analog computer circuit capable of performing division, multiplication and square root is described in U.S. Pat. No. 3,043,516, Abbott et al, assigned to the assignee of the present invention. In Abbott et al, as described in the paragraph commencing at column 1, line 48, a first analog input signal, B, drives a first summing device, or integrating circuit. The output of the first integrating circuit is compared to a second analog input signal, A, by means of a comparator circuit. As long as the output of the first integrating circuit is less than the second analog input signal, the comparator circuit allows a second integrating circuit to perform a time summation, or integration of a third analog input signal, $V$. The output, $W$, of the second integrating circuit is equal to $VA/B$. As described in column 3, line 45, of the Abbott et al patent, the computation cycle is begun by simultaneously applying the first analog input signal to the first integrating circuit, the second analog input signal to the comparator circuit and the third analog input signal to the second integrating circuit. This computation cycle is complete when the comparator circuit stops the integration by the second integrating circuit. Thus, in the Abbott et al circuit, the comparator circuit generates a signal that has a time duration that is proportional to the ratio of the second analog input signal to the first analog input signal. This time duration is used to control the length of time that a third analog input signal is integrated, and this integrated output will have an amplitude that is proportional to the amplitude of the third input signal times the ratio of the second input signal to the first input signal.

The analog circuit of Abbott et al has two shortcomings. The first is the need to control the analog computer circuit with an external clock signal. Every time a computation is desired, it is necessary to discharge the capacitors in the first and second integrating circuits and to provide for the simultaneous reapplication of the first, second and third analog input signals. The second shortcoming of the Abbott et al circuit is that for a given polarity of the first analog input signal, the capacitor in the first integrating circuit always charges up with the same polarity of voltage. At the start of each computation cycle, the capacitor is connected to circuit ground to discharge it but due to dielectric absorption, or memory effect, a small charge remains on the capacitor which causes an error in the subsequent computation.

It is, therefore, an object of this invention to provide a novel analog computer circuit.

It is another object of the present invention to provide an analog computer circuit capable of performing division, multiplication and the taking of square roots.

It is a further object of the present invention to provide an analog computer circuit that is self-clocking.

SUMMARY OF THE INVENTION

In the present invention, three input variables are represented as slowly varying d-c voltages. An integrating amplifier is driven by a d-c voltage, representing the first input variable, that is periodically reversed in polarity so that the amplifier output is a triangular wave. The input to the amplifier is reversed each time the output reaches a predetermined magnitude as determined by the voltage magnitude of the second variable so that the triangular wave is constrained to cycle about zero volts with a frequency that is a function of the magnitudes of the first and second input voltages. Thus, as the magnitude of the voltage into the integrating amplifier is increased, the frequency will increase proportionally, and as the magnitude of the second variable increases, the frequency of the triangular wave will decrease proportionally. A low pass filter that is driven by a pulse having a constant voltage amplitude and a fixed time duration will have an output voltage that is proportional to the pulse amplitude times the pulse frequency. In the analog computer circuit of this invention, the frequency of the pulses applied to the low pass filter is controlled by the frequency of the triangular wave form, and the pulse amplitude is determined by the magnitude of the voltage representing the third input variable. Thus, the output of the low pass filter will have a voltage that is proportional to the product of the first and third input voltages and inversely proportional to the second input voltage.

The analog computer circuit of this invention differs from the analog computer circuit described in Abbott et al in that the Abbott et al circuit drives a low pass filter with a pulse that has a time duration proportional to the ratio of a first input signal to a second input signal, and an amplitude proportional to a third input signal, whereas in the present invention low pass filter is driven with a pulse, having a fixed time duration, which occurs at a frequency proportional to the ratio of a first input signal to a second input signal and having an amplitude proportional to a third input variable. Another significant difference is that due to the oscillatory nature of the integrating amplifier and comparator circuitry, there is no need to externally synchronize the operation of the analog computer circuit and no need to discharge the storing capacitors associated with the integrating circuits.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

FIG. 2 comprising FIGS. 2a–2e is a timing diagram illustrating the wave forms that occur at selected points in the block diagram of FIG. 1.

FIG. 3 comprising

DETAILED DESCRIPTION

Figure 1:
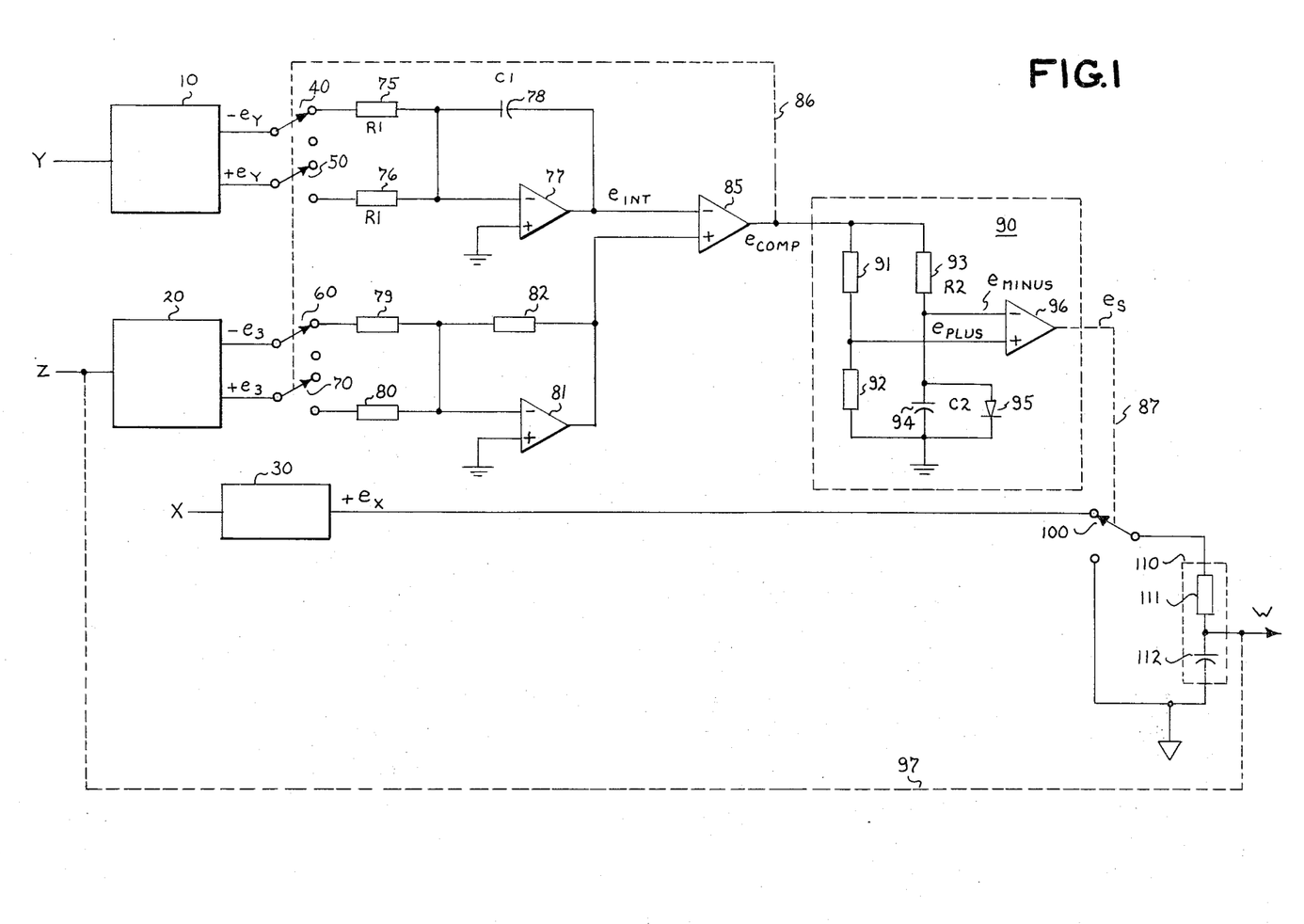
FIG. 1 is a schematic block diagram of an analog computer circuit of this invention which performs the arithmetic operation $W = XY/Z$.

Referring now to FIG. 1, there is shown in block diagram form an analog computer circuit for generating an output voltage, $W = XY/Z$, where $X$, $Y$ and $Z$ are analog input voltages. The analog input signal $Y$ drives a converter circuit 10 that has a $+e_y$ voltage output and a $-e_y$ voltage output. Both the $+e_y$ and the $-e_y$ voltage outputs have the same magnitude and are proportional to the voltage amplitude of the analog input signal $Y$ and, as designated, are of opposing polarities. In a similar manner, the input variable $Z$ drives a conversion circuit 20 having a $-e_z$ voltage output and a $+e_z$ voltage output. The $-e_z$ and $+e_z$ voltage outputs are equal in magnitude and proportional to the amplitude of the analog input voltage $Z$ but are of opposite polarities. The outputs $-e_y$, $+e_y$, $-e_z$ and $+e_z$ are connected to the poles of single-pole, single-throw switches 40, 50, 60 and 70, respectively. The voltage $-e_y$ is applied to an integrating amplifier 77 through switch 40 and resistor 75, and the $+e_y$ signal is applied to integrating amplifier 77 through switch 50 and resistor 76. Amplifier 77 acts as an integrating amplifier by virtue of capacitor 78, connected across the output of amplifier 77 and the negative input of amplifier 77. Switches 40 and 50 are connected to resistors 75 and 76 so that when the signal $-e_y$ is connected to resistor 75, the signal $+e_y$ is disconnected from is associated input resistor 76, and when the signal $+e_y$ is connected to resistor 76, the signal $-e_y$ is disconnected from resistor 75. It should be pointed out that, in this block diagram description, one switch and resistor combination could have been omitted. That is to say that resistor 75 could have been connected to the pole of a double-throw switch, and the signals $-e_y$ and $+e_y$ connected to the two positions of the switch so that the resistor 75 could then be switched between the $+e_y$ and $-e_y$ signal. A slightly more complicated block diagram is illustrated so that the block diagram of FIG. 1 will coincide with the preferred embodiment illustrated in FIG. 3.

In a similar manner, the signal $-e_z$ is applied to inverting amplifier 81 through switch 60 and resistor 79 and the signal $+e_z$ is applied to the input of amplifier 81 through switch 70 and resistor 80. The amplifier 81 is used as an inverting amplifier as determined by resistor 82 which is connected across the output of amplifier 81 and the negative input of amplifier 81. It will also be apparent to one skilled in the art that amplifier 81 is not a necessary element in a block diagram description of the analog computer circuit of this invention. In other words the output of amplifier 81, which drives the positive input of comparator amplifier 85, could have been connected to the pole of a double-throw switch and the two positions of the switch connected to the $-e_z$ signal and the $+e_z$ signal. Again, although the amplifier 81 and its associated components do not lend anything to the functional block diagram description of this invention, it is included so that FIG. 1 will directly coincide with the preferred embodiment described in detail in connection with FIG. 3.

The output of integrating amplifier 77 drives one input of a comparison amplifier 85 while the output of amplifier 81 drives the other input of comparison amplifier 85. The output of the comparison circuit 85 is a square wave signal having a first voltage level when the voltage at the negative input terminal of the comparison amplifier 85 is less than the voltage at the positive input terminal of the comparison amplifier 85 and has a second voltage level when the voltage at the negative input terminal of the comparison amplifier 85 is greater than the voltage at the positive input terminal. Switches 40, 50, 60 and 70 operate in response to the output voltage level of comparison amplifier 85 and this is illustrated by the dashed line 86 connecting the output of amplifier 85 with the switches 40, 50, 60 and 70. When the voltage at the negative terminal of comparison amplifier 85 is less than the voltage at the positive terminal of the amplifier 85, the first voltage level output of the comparison amplifier 85 will cause switches 40, 50, 60 and 70 to be in the position as illustrated in FIG. 1. When the voltage at the negative input terminal of comparison amplifier 85 is greater than the voltage at the positive input terminal of comparison amplifier 85, the second voltage level output of amplifier 85 will cause switches 40 and 60 to open and switches 50 and 70 to close.

The circuits heretofore described will cause the output of comparison amplifier 85 to oscillate at a frequency that is proportional to the ratio of the amplitude of the analog input voltage $Y$ to the amplitude of the analog input signal $Z$. If the switches 40, 50, 60 and 70 are in the position as illustrated in FIG. 1, the signal $-e_y$ will be applied to the input of the integrating amplifier 77. The integrating amplifier 77 besides performing the time integral of the input voltage also multiplies by a factor of minus 1 as the input signal is applied to the negative terminal of the amplifier 77. Therefore, as a result of the voltage $-e_y$ being applied to the input of the integrating amplifier 77, the output of the integrating amplifier 77 will be a ramp voltage that is increasing in the positive direction at a constant rate. This ramp voltage is applied to the negative input of comparison amplifier 85. In a similar manner, the input signal $-e_z$ is multiplied by a factor of minus 1 by amplifier 81 thereby applying a voltage equal to $+e_z$ at the positive input terminal of comparison amplifier 85. Initially, the voltage output of the integrating amplifier 77 will be less than the voltage $+e_z$ and the output of the comparison amplifier 85 will be at the first voltage level which will maintain the signal $-e_y$ and $-e_z$ connected to amplifiers 77 and 81, respectively. When the ramp voltage becomes equal to the voltage $+e_z$ at the positive input terminal of the comparison amplifier 85, the comparator output will switch to the second voltage level causing switches 40 and 60 to open and switches 50 and 70 to close, and now the signal $+e_y$ will be connected to the integrating amplifier 77 and the signal $+e_z$ will be connected to the amplifier 81. At this point, the output voltage of the integrating amplifier 77 will begin to ramp in the negative direction at a constant slope and the voltage level $-e_z$ will be present at the positive input terminal of the comparison amplifier 85. The signal at the negative input terminal of the comparison amplifier 85 will be greater than the signal at the positive input terminal and the output of the comparison amplifier 85 will be at the second voltage level which will maintain the condition of switches 40, 50, 60 and 70. As the output of integrating amplifier 77 continues to ramp in the negative direction, it will eventually drive the negative input terminal of comparison amplifier 85 below the voltage $-e_z$ appearing at the positive input terminal of comparison amplifier 85 thereby causing the output of the comparison amplifier 85 to be switched again to the first voltage level which, in turn, causes switches 40, 50, 60 and 70 to return to the position illustrated in FIG. 1. Thus, it can be seen that the circuit is self oscillating and that the comparator output will be a square wave. Furthermore, the magnitude of the voltage Y determines the slope of the ramping voltage and when the slope of the ramping voltage increases, the output of the integrating amplifier 77 reaches the comparison voltage $e_z$ more quickly which shortens the pulse duration. Immediately thereafter, the switches are automatically repositioned and another comparison begins and, therefore, the frequency of the square wave signal output of the comparison amplifier 85 increases.

This is different than the apparatus of Abbott, in which the operation of the comparator is initiated each time by an external clock pulse which, therefore, controls the output frequency therein. Also, as the amplitude of the analog input signal Z increases, the magnitude of the voltage at the positive input to the comparison amplifier increases which means that it will take longer for the integrating amplifier output to reach the comparison level which has the effect of lowering the frequency of the square wave signal output of the comparison amplifier 85. In other words, the frequency at which the comparison amplifier oscillates is directly proportional to the amplitude of the analog input signal Y and is inversely proportional to the amplitude of the analog input signal Z.

The square wave output of comparison amplifier 85 drives a circuit 90 that generates a pulse once during each cycle of the square wave, each pulse having a fixed time duration. The square wave signal of comparison amplifier 85 drives a voltage divider network consisting of resistors 91 and 92. The square wave signal of comparison amplifier 85 also drives a second network consisting of resistor 93 in series with capacitor 94. A diode 95 is in parallel with capacitor 94 and poled to allow a negative voltage to build up on capacitor 94. The positive input terminal of a difference amplifier 96 is driven from the voltage divider network, and the negative input terminal of difference amplifier 96 is driven from the junction of resistor 93 and capacitor 94. When the square wave signal of comparison amplifier 85 is at the positive voltage level, a positive reference level will be established at the positive input terminal of difference amplifier 96 as determined by the ratio of resistors 91 and 92. When the positive voltage of the square wave frequency is applied to the network consisting of resistor 93, capacitor 94 and diode 95, diode 95 is biased in the forward direction and acts to prevent the capacitor 94 from building up a positive voltage. Thus, the negative input terminal of the difference amplifier 96 is clamped to the circuit ground by the diode 95. As long as the output of comparison amplifier 85 remains positive, the negative input terminal of difference amplifier 96 will be clamped to ground and will remain less than the voltage applied to the positive input terminal of difference amplifier 96, and the difference amplifier 96 will have an output voltage having the first voltage level. When the signal out of comparison amplifier 85 is a negative voltage, a negative reference voltage will be applied to the positive input terminal of difference amplifier 96 as determined by the ratio of resistors 91 and 92. When the negative voltage of the comparison amplifier 85 is applied to the network consisting of resistor 93, capacitor 94 and diode 95, diode 95 is back biased and capacitor 94 will be allowed to build up a negative voltage. The voltage across capacitor 94 will build up exponentially as determined by the values of resistor 93 and capacitor 94. When the output of comparison amplifier 85 initially goes negative, the voltage across capacitor 94 and thus the voltage at the negative input terminal of difference amplifier 96 is very nearly zero, and the voltage at the positive input terminal of difference amplifier 96 is the negative reference level. Since the voltage at the negative input terminal of difference amplifier 96 is greater than the voltage at the positive input terminal, the output of difference amplifier 96 will have the second voltage level. Eventually the negative voltage builds up on capacitor 94 so that it exceeds the voltage established by the voltage divider network, thereby causing the output of difference amplifier 96 to switch back to the first voltage level. The length of time that the difference amplifier 96 will be at the second voltage level is determined entirely by the time constant established by resistor 93 and capacitor 94 and will be the same for each cycle of the output signal of comparison amplifier 85.

The analog input signal X drives a converter circuit 30 that has a +$e_x$ output. The voltage $e_x$ is connected to the normally closed position of switch 100, the pole of switch 100 is connected to an integrating circuit 110 that consists of resistor 111 and capacitor 112. The integrating network 110 is connected to a reference, typically ground through the normally open contact of switch 100. The converter circuit 30 of this figure is also not necessary in this block diagram explanation. The input signal X could have been directly connected to the pole of switch 100. The converter circuit 30 is described here so that this block diagram will coincide with the later description of a preferred embodiment as described in conjunction with FIG. 3. Switch 100 is operated by the voltage output of difference amplifier 96 as denoted by the dashed line 87. When the output difference amplifier 96 is at the second voltage level, the signal +$e_x$ is connected to the integrating circuit 110. When the first voltage level exists at the output of difference amplifier 96, switch 100 operates to connect circuit ground to integrating circuit 110. The output W of the analog computer circuit is taken across capacitor 112. The voltage appearing across capacitor 112 will be proportional to the amplitude of the signal +$e_x$, the length of time that the switch 100 connects the signal +$e_x$ to the integrating network 110, and to the frequency of occurrence of the pulses generated by difference amplifier 96. The amplitude of the signal $e_x$ is proportional to the amplitude of the analog input signal X. The pulse width, or the length of time that the difference amplifier 96 has the second output level, is fixed and the frequency of occurrence of the pulses is proportional to the ratio of the amplitude of the input signal Y to the amplitude of the input signal Z. Therefore, the output W is proportional to $XY/Z$.

If an analog signal Y is applied to the input of converter circuit 10 and converter circuit 20, the output signal W will be proportional to $Y^2/X$.

If the input of converter circuit 20 is driven by the signal W, the output W will be proportional to $XY/W$. Solving this relationship for W gives the result that W equals $\sqrt{XY}$.

Figure 2A:
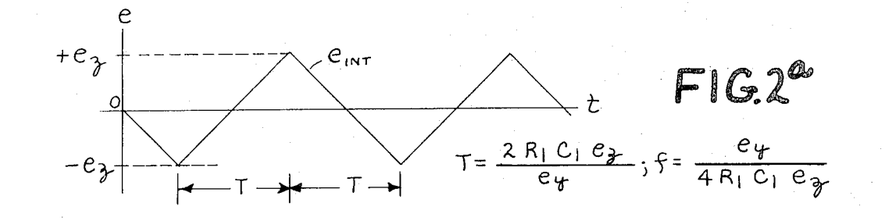

FIG. 2A shows the triangular wave form output, $e_{int}$, of integrating amplifier 77 as a function of time. The time that it takes the signal $e_{int}$ to ramp between $-e_z$ and $+e_z$ is equal to $2 R_1 C_1 e_z/e_y$ where $R_1$ is the value of resistors 75 and 76, and $C_1$ is the value of capacitor 78. The frequency of the triangular wave form $e_{int}$ is equal to $e_y/4 R_1 C_1 e_z$.

Figure 2B:
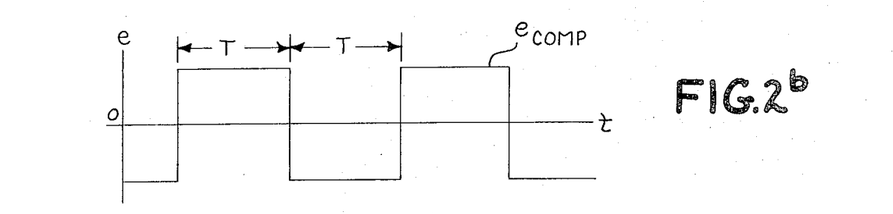

FIG. 2B shows the square wave output, $e_{comp}$, of comparison amplifier 85 as a function of time.

Figure 2C:
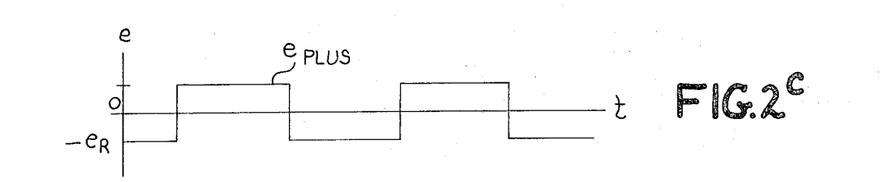

FIG. 2C shows the voltage $e_{plus}$ which appears at the positive input terminal of difference amplifier 96 as a function of time. The negative voltage level of the signal $e_{plus}$ has been designated as $-e_r$.

Figure 2D:
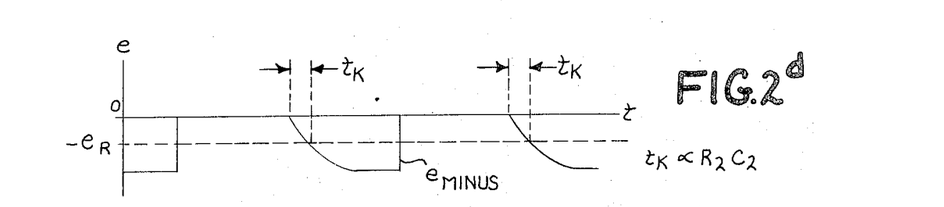

FIG. 2D shows the wave form $e_{minus}$ which appears at the negative input terminal of difference amplifier 96. Also shown as a dotted line is the voltage level $-e_r$, the negative level of the signal appearing at the positive input terminal of difference amplifier 96. The time during which the signal $e_{minus}$ is greater than the level $-e_r$ is determined by the time constant of resistor 93, $R_2$, and capacitor 94, $C_2$. This time has been designated $t_k$ and is proportional to $R_2 C_2$.

Figure 2E:
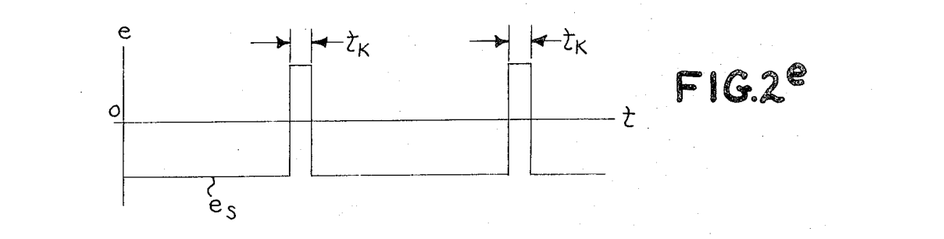

FIG. 2E shows the signal $e_s$ which is the output of difference amplifier 96. The signal $e_s$ is shown to be positive for the time period $t_k$ and negative at all other times.

At this point, several comments will be made as to the selection and use of capacitors 78, $C_1$, and 94, $C_2$. Since the voltage across capacitor 78 continually ramps between $-e_z$ and $+e_z$, the aforementioned error due to dielectric absorption, or memory effect, is significantly reduced with respect to that capacitor. Furthermore, the output, $W$, is proportional to the ratio $t_k/T$ which is determined by the ratio of $C_2/C_1$. In other words, the stability of the output is related to the stability of capacitors 78, $C_1$, and 94, $C_2$. In a preferred embodiment of this invention, capacitors 78 and 94 are matched so that the circuit is made relatively insensitive to any drifting due to aging and temperature change of the capacitors.

Figure 3A:
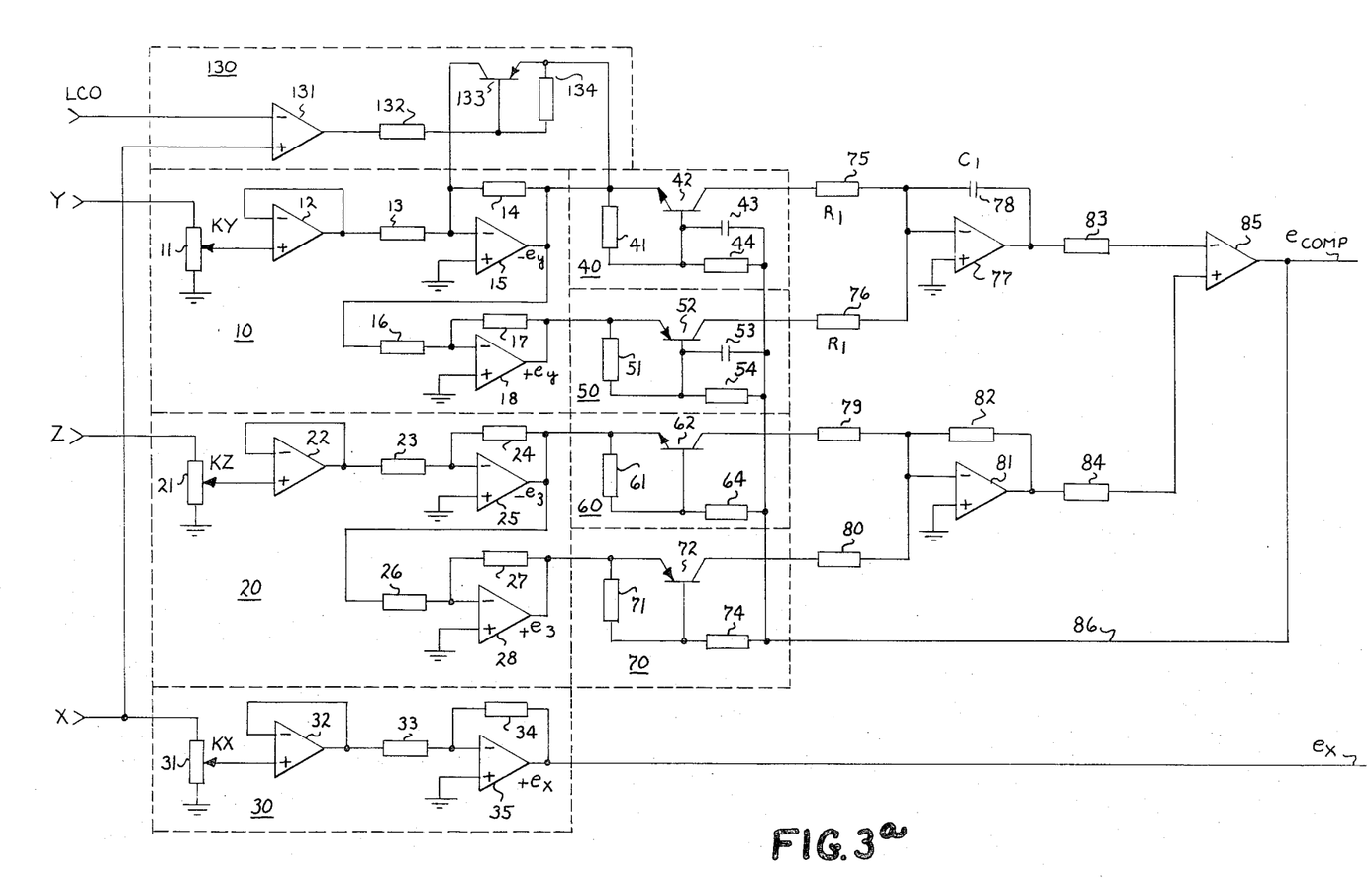
FIGS. 3a and 3b, is a schematic diagram of a preferred embodiment of this invention.
Figure 3B:
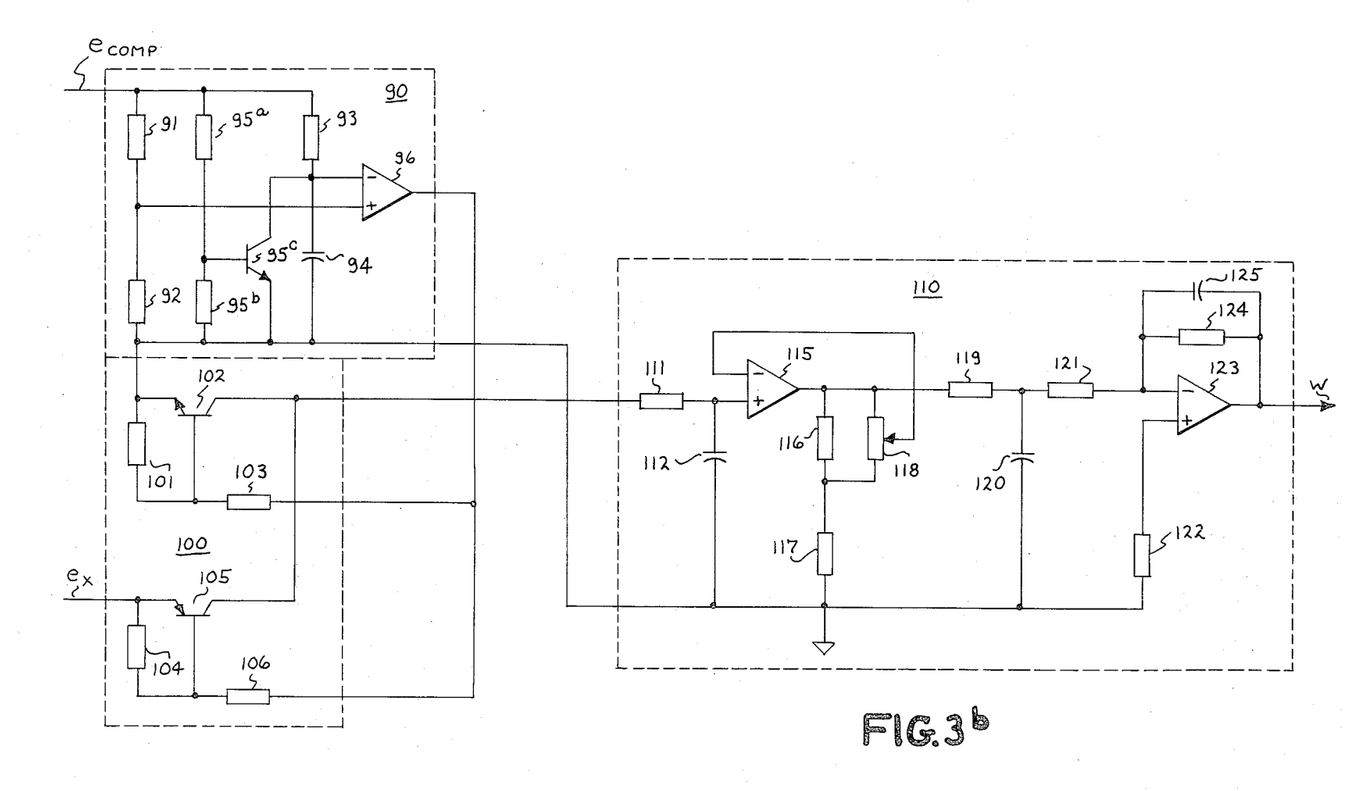

FIG. 3 is a preferred embodiment of the circuit shown in block diagram form in FIG. 1. For the sake of convenience, certain elements depicted in FIG. 3 have retained element designations as assigned in FIG. 1. The analog input signal $Y$ is applied to a scaling potentiometer 11. The signal appearing at the arm of potentiometer 11 is designated $KY$ and is applied to the positive input of amplifier 12. Since the output of amplifier 12 is fed back to the negative input terminal of amplifier 12, it acts as a voltage follower, or buffer amplifier. The output of buffer amplifier 12 is applied to amplifier 15 through resistor 13. The positive input terminal of amplifier 15 is connected to ground and resistor 14 is connected between the output of amplifier 15 and the negative input terminal of amplifier 15. The output of amplifier 15 has been designated $-e_y$ and will be of opposite polarity to the output of amplifier 12. The output of amplifier 15 drives the negative input terminal of amplifier 18 through resistor 16. The output of amplifier 18 is fed back to its negative input terminal through resistor 17. Resistors 17 and 16 will have the same value so that amplifier 18 will have a gain of $-1$. Thus, the output of amplifier 18 will be equal to $+e_y$.

In a similar manner, the analog input signal $Z$ is applied to scaling potentiometer 21, and the scaled signal $KZ$ is applied to buffer amplifier 22 which drives inverting amplifier 25. The gain of inverting amplifier 25 is determined by resistors 23 and 24, and the output of inverting amplifier 25 has been designated $-e_z$. Amplifier 25 drives inverting amplifier 28 which has a gain of $-1$ as determined by resistors 26 and 27. Thus, the output of amplifier 28 is $+e_z$.

The switch 40 consists of NPN transistor 42, biasing resistors 41 and 44, and speed-up capacitor 43, and the switch 50 consists of PNP transistor 52, biasing resistors 51 and 54, and speed-up capacitor 53. Switches 40 and 50 are controlled by the voltage level output of comparison amplifier 85. The positive and negative voltage levels of the output of comparison amplifier 85 are selected so that either transistor 42 or transistors 52 will be conductive. When the positive voltage level appears at the output of amplifier 85, the base-emitter junction of transistor 42 will be forward biased and transistor 42 will be conductive thereby allowing the $-e_y$ signal from inverting amplifier 15 to be applied to resistor 75. The positive voltage level from amplifier 85 also back biases the base-emitter junction of transistor 52 thereby making it non-conductive which in effect opens the circuit path between the $+e_y$ output of inverting amplifier 18 and resistor 76. When the negative voltage output appears at the output of amplifier 85, transistor 42 will be back biased and transistor 52 will be forward biased which disconnects the signal $-e_y$ from resistor 75 and connects the signal $+e_y$ to the resistor 76. In a similar manner switch 60, which consists of NPN transistor 62 and bias resistors 61 and 64, and switch 70 which consists of PNP transistor 72 and bias resistors 71 and 74, control the application of the signals $-e_z$ and $+e_z$ to amplifier 81. Thus, when the positive voltage level appears at the output of amplifier 85, transistor 62 will be conductive and the $-e_z$ signal will be applied to the resistor 79, and transistor 72 will be non-conductive which disconnects the $+e_z$ signal from resistor 80; and when the negative voltage level appears at the output of amplifier 85, transistor 62 will be non-conductive and the $-e_z$ signal will be disconnected from the resistor 79, the transistor 72 will be conductive and the $+e_z$ signal will be connected to the resistor 80.

As mentioned in the description of FIG. 1, integrating amplifier 77 successively integrates the $-e_y$ and $+e_y$ signals. The output of integrating amplifier 77 is applied to the negative input terminal of comparison amplifier 85 through resistor 83, and the output of amplifier 81 is applied to the positive input of comparison amplifier 85 through resistor 84.

The circuit 90 generates a pulse having a fixed time duration once during each cycle of the square wave appearing at the output of amplifier 85. In the block diagram of FIG. 1, a diode 95 was shown in parallel with capacitor 94. In this preferred embodiment, the diode 95 has been replaced by a NPN transistor 95c and biasing resistors 95a and 95b to accomplish the same function. When the positive voltage level appears at the output of amplifier 85, the base-emitter junction of transistor 95c will be forward biased, and transistor 95c will conduct thereby shorting the negative input terminal of amplifier 96 to ground. When the negative voltage level appears at the output of amplifier 85, the base-emitter junction of transistor 95c will be back biased, and the collector-emitter circuit of transistor 95c will appear to be an effective open circuit thereby allowing capacitor 94 and the negative input terminal of amplifier 96 to charge to a negative voltage.

The analog input signal $X$ is applied to scaling potentiometer 31 and the voltage $KX$, appearing at the arm of potentiometer 31, is applied to the positive input terminal of amplifier 32. Since the output of amplifier 32 is connected to the negative input terminal of amplifier 32, it acts as a voltage follower or buffer amplifier. The output of buffer amplifier 32 is applied to the negative input terminal of amplifier 35 through resistor 33. The positive input terminal of amplifier 35 is connected to ground and the gain of amplifier 35 is determined by the ratio of resistor 34 to resistor 33. The output of amplifier 35 has been designated $-e_x$. The switch 100 acts to connect either the signal $-e_x$, which appears at the emitter of transistor 105, or ground, which appears at the emitter of transistor 102, to the integrating circuit 110. The switch 100 consists of NPN transistor 102 and its associated bias resistors 101 and 103, and PNP transistor 105 and its associated bias resistors 104 and 106. The switch 100 is controlled by the voltage level appearing at the output of amplifier 96. When a sufficiently positive voltage appears at the output of amplifier 96, the base-emitter junction of transistor 102 will be forward biased thereby allowing transistor 102 to be conductive and ground will be connected to the integrating circuit 110. Also, when the positive voltage level appears at the output of amplifier 96, the base-emitter junction of transistor 105 is back biased and transistor 105 is non-conductive and presents an effective open circuit between the signal $-e_x$ and the input to integrating circuit 110. Similarly, when a sufficiently negative voltage appears at the output of amplifier 96, transistor 102 will be non-conductive and an open circuit will exist between ground and the input to integrating circuit 110, and transistor 105 will be made conductive thereby allowing the signal $-e_x$ to be applied to the input of integrating circuit 110.

In FIG. 1, a simple RC filter was used to integrate the signal passed through switch 100. In the preferred embodiment of FIG. 3, additional filtering is provided by resistors 119, 121 and capacitor 120 and resistor 124, capacitor 125 and inverting amplifier 123. Non-inverting amplifier 115 in conjunction with resistors 116 and 117 and potentiometer 118 acts to prevent the loading down of the signal appearing at the output of capacitor 112 and also provides for fine gain adjustment of the output signal, $W$.

A low level signal cutoff circuit 130 is used to eliminate undesirable output signals due to high gain at low input levels. The low level signal cutoff circuit 130 consists of difference amplifier 131, switch transistor 133 and bias resistors 132 and 134. A low level cutoff reference signal, LCO, is applied to the negative input terminal of amplifier 131. The analog input signal $X$ is applied to the positive input terminal of amplifier 131, and when the analog input signal $X$ is less than the low level cutoff signal, LCO, the output of amplifier 131 will be a negative voltage level which causes the emitter-base junction of transistor 133 to be conductive which in effect short circuits the output of amplifier 15 to the negative input terminal of amplifier 15 thereby causing amplifier 15 to have a gain of zero.

While the present invention has been described with reference to a specific embodiment thereof, it will be obvious to those skilled in the art that various changes and modifications may be made without departing from the invention in its broader aspects.

It is contemplated in the appended claims to cover all variations and modifications of the invention which come within the true spirit and scope of the invention.

What is claimed as new and desired to be secured by Letters Patent of the United States is:

1. An analog computer circuit having an output voltage that is a function of first, second and third input signals comprising:
  a. first circuit means including an integrating circuit responsive to the first input signal and a comparator responsive to said integrating circuit and to the second input signal for generating a signal having a frequency proportional to the ratio of the amplitude of the first input signal to the amplitude of the second input signal by automatically resetting the circuit for another comparison immediately after each comparison is effected; and
  b. second circuit means responsive to said signal frequency and to the third signal for generating a signal having an amplitude that is proportional to the product of said ratio and the amplitude of the third input signal.

2. An analog computer circuit as recited in claim 1 wherein the amplitude of the first input signal equals the amplitude of the third input signal whereby the signal generated by the second circuit means is directly proportional to the square of the amplitude of the first signal and inversely proportional to the amplitude of the second signal.

3. An analog computer circuit as recited in claim 1 wherein the second input signal is equal to the signal generated by the second circuit means whereby the amplitude of the signal generated by the second circuit means is directly proportional to the square root of the product of the amplitudes of the first and third input signals.

4. An analog computer circuit as recited in claim 1 wherein the second circuit means comprises:
  a. gate circuit means responsive to said signal frequency and to the third input signal for passing the third input signal to the gate circuit output for a fixed time period at a rate determined by said signal frequency; and
  b. filter circuit means responsive to the gate circuit output for averaging the gate circuit output signal.

5. An analog computer circuit as recited in claim 1 wherein the second circuit means comprises:
  a. trigger circuit means responsive to said signal frequency for generating a trigger pulse having a fixed time duration once during each cycle of said signal frequency;
  b. a filter circuit; and
  c. switch means responsive to the trigger pulse for selectively applying the third input signal to the filter for said fixed time duration, and a reference potential to the filter circuit during the remainder of each cycle of said signal frequency.

6. An analog computer circuit having an output voltage that is a function of first, second and third input signals comprising:
  a. first circuit means responsive to the first input signal for generating first and second signals of opposite polarity and having a magnitude proportional to the amplitude of the first input signal;
  b. second circuit means responsive to the second input signal for generating third and fourth signals of opposite polarity and having a magnitude proportional to the amplitude of the second input signal;

c. integrating circuit means responsive selectively to the first and second signals for generating a fifth signal that is the time integral of the first and second signals;

d. comparator circuit means having a first input responsive to the fifth signal and a second input responsive selectively to the third and fourth signals for generating a signal frequency having a first level when the signal at the first input is less than the signal at the second input, and a second level when the signal at the first input is greater than the signal at the second input;

e. switch means responsive to the first comparator level for connecting the positive polarity signal of the first circuit to the integrating circuit and the positive polarity signal of the second circuit to the second input of the comparator circuit and responsive to the second comparator level for connecting the negative polarity signal of the first circuit to the integrating circuit and the negative polarity signal of the second circuit to the second input of the comparator circuit whereby the comparator output has a frequency that is proportional to the ratio of the amplitude of the first input signal to the amplitude of the second input signal; and f. third circuit means responsive to said signal frequency and the third input signal for generating a voltage that is proportional to the product of said ratio and the amplitude of the third input signal.

7. An analog computer circuit as recited in claim 6 wherein the amplitude of the first input signal equals the amplitude of the third input signal whereby the signal generated by the third circuit means is directly proportional to the square of the amplitude of the first signal and inversely proportional to the amplitude of the second signal.

8. An analog computer circuit as recited in claim 6 wherein the second input signal is equal to the signal generated by the third circuit means whereby the signal generated by the second circuit means is directly proportional to the square root of the product of the amplitudes of the first and third input signals.

9. An analog computer circuit as recited in claim 6 wherein the third circuit means comprises:

a. gate circuit means responsive to said signal frequency and to the third input signal for passing the third input signal to the gate circuit output for a fixed time period at a rate determined by said signal frequency; and b. filter circuit means responsive to the gate circuit output for averaging the gate circuit output signal.

10. An analog computer circuit as recited in claim 6 wherein the third circuit means comprises:

a. trigger circuit means responsive to said signal frequency for generating a trigger pulse having a fixed time duration once during each cycle of said signal frequency;

b. a filter circuit; and c. switch means responsive to the trigger pulse for selectively applying the third input signal to the filter for said fixed time duration and for applying a reference potential to the filter circuit during the remainder of each cycle of said signal frequency.

11. An analog computer circuit having an output voltage that is a function of first, second and third input signals comprising:

a. integrating circuit means responsive selectively to the first input signal and to a second signal, said second signal being of equal magnitude and of opposite polarity to the first input signal, for generating a third signal that is the time integral of the first input signal and the second signals;

b. comparator circuit means having a first input responsive to the third signal and a second input responsive selectively to the second input signal and to a fourth signal, said fourth signal being of equal magnitude and of opposite polarity to the second input signal, for generating a signal frequency having a first level when the signal at the first comparator input is less than the signal at the second comparator input, and a second level when the signal at the first comparator input is greater than the signal at the second comparator input;

c. switch means responsive to the first comparator level for connecting the positive polarized of said first input signal and said second signal to the integrating circuit and the positively polarized of said second input signal and said fourth signal to the second input of the comparator circuit and responsive to the second comparator level for connecting the negatively polarized of said first input signal and said second signal to the integrating circuit and the negatively polarized of said second input signal and said fourth signal to the second input of the comparator circuit whereby the comparator output has a frequency that is proportional to the ratio of the amplitude of the first input signal to the amplitude of the second input signal; and d. circuit means responsive to said signal frequency and the third input signal for generating a voltage that is proportional to the product of said ratio and the amplitude of the third input signal.

12. An analog computer circuit as recited in claim 11 additionally comprising:

a. first circuit means responsive to the first input signal for generating the second signal; and b. second circuit means responsive to the second input signal for generating the fourth signal.

* * * * *